INVENTORS:
WERNER BANDEL
HERBERT HILPERT
HANS TRECKMANN
ERNST PIROT

United States Patent Office 3,567,566
Patented Mar. 2, 1971

3,567,566
COMPOSITE REINFORCED THERMOPLASTIC FOIL LAMINATE
Werner Bandel, Wuppertal, Herbert Hilpert, Schwelm, and Hans Treckmann and Ernst Pirot, Wuppertal, Germany, assignors to J. P. Bemberg Aktiengesellschaft, Wuppertal, Germany
Filed Jan. 2, 1969, Ser. No. 788,472
Claims priority, application Germany, Jan. 3, 1968, P 17 04 517.9
Int. Cl. B32b 5/12, 27/12
U.S. Cl. 161—55    24 Claims

ABSTRACT OF THE DISCLOSURE

A composite thermoplastic foil consisting of two outer foil sheets interconnected by an adhesive between which there is inserted a grid-shaped or latticed planar reinforcing structure which consists of longitudinally stretched narrow foil strips laid in a criss-cross pattern at spaced substantially parallel intervals, the individual strips having a thickness of not more than 100 microns and a width of approximately 1 to 6 mm. with a spaced interval between individual pairs of strips of at least 1.5 times the width of the strips. It is particularly desirable to provide foil strips having a proportionately higher elongation at break, breaking strength and elastic strain value but a lower ductility than the outer foil sheets. The resulting composite foil is particularly useful as a packaging material which is subject to a high degree of local stresses or forces tending to rupture the foil.

---

Figure 1:
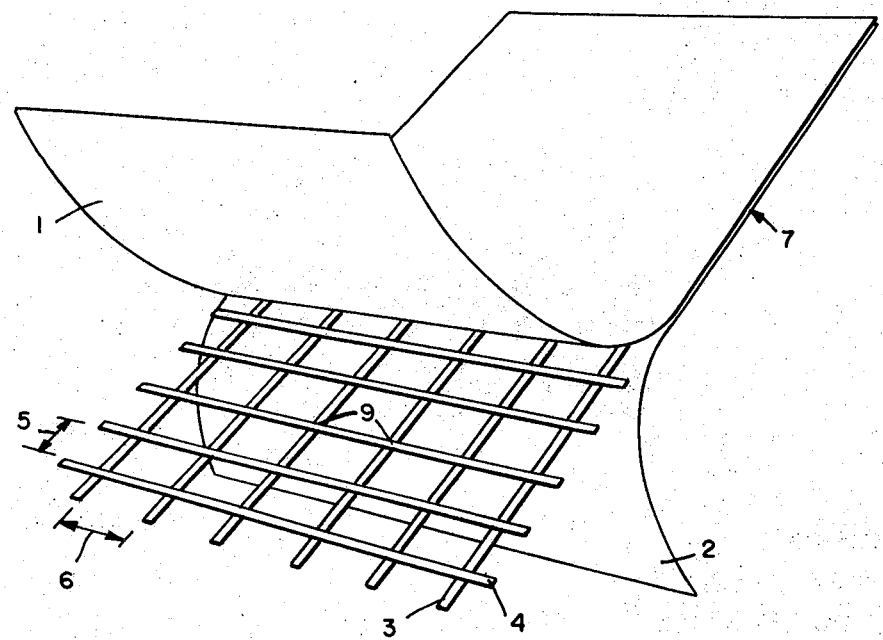

In general, composite thermoplastic foils are known in which two outer or covering foil sheets enclose a reinforcing insert which is composed of a wide-meshed fibrous textile web. In these composite foils, the planar structure of the textile web usually consists of so-called thread layers, i.e. the individual filaments or threads are arranged in two or more groups extending in different directions to each other are not interconnected as in a woven or knitted fabric structure but instead are positioned loosely in superimposed planes, e.g. such that the lengthwise threads all lie on top of the crosswise threads, all of the threads in one plane generally being parallel to one another.

Although such composite foils containing a filamentary textile web exhibit a relatively high strength, they are very easily damaged if, for example, objects with sharp edges are packaged therein or if the composite foil comes into contact with such objects. Under these circumstances, the threads which are laid between the two outer foil sheets and which form a reinforcing textile structure also have a strong tendency to cut open the foil at individually stressed points. Another disadvantage which must be taken into consideration is the fact that the individual threads, which must be held relatively strongly between the two foil sheets, these threads generally having a titer of at least 100 to 150 denier, usually at least 200 denier or more, constitute a proportionately heavy or thick insert. Aside from the fact that the foil then acquires a ribbed or corded structural appearance, which is highly unsatisfactory for many purposes, any adhesion between the outer or covering foils tends to become easily loosened or detached adjacent the threads and this often leads to the complete separation or opening of the entire adhered portion between two parallel threads.

One object of the present invention is to provide a composite thermoplastic foil which is protected against local tearing at strongly stressed points and which moreover contains a reinforcing insert which is not at all bulky and does not tend to detach the adhering outer foils.

Another object of the invention is to provide a composite thermoplastic foil which is relatively easy to fabricate and can be made from materials which at least initially are quite similar to each other but which still provide a strong reinforced composite foil. These and other objects and advantages of the invention will become more apparent upon consideration of the following detailed specification.

It has now been found, in accordance with the invention, that a substantial improvement can be achieved in a composite thermoplastic foil by providing a substantially flat and even planar or sheet-like structure consisting of two outer foil sheets interconnected by an adhesive and a grid-shaped or latticed planar reinforcing structure held between the two outer sheets and consisting of longitudinally stretched narrow foil strips laid in a criss-cross pattern to provide two sets of substantially parallel strips arranged at a spaced interval between individual pairs of strips of at least 1.5 times the width of the strips. In general, the strips should have a width of approximately 1 to 6 mm., preferably 2 to 4 mm., and should have a thickness of not more than 100 microns and ordinarily not less than 5 microns, preferably about 20 to 75 microns. Even when using such extremely thin foil strips for the reinforcing structure as the middle layer of the composite foil, one surprisingly achieves an extremely strong and non-tearable packaging foil provided that the narrow foil strips have been longitudinally stretched to provide a proportionately higher elongation at break, breaking strength and elastic strain value but a lower ductility than the outer foil sheets.

It is particularly advantageous to thermally fix the narrow foil strips after they have been stretched but before they have been incorporated as the grid-shaped insert for the composite foil. Such thermal fixation of stretched foils is well known in the art and simply involves heating the stretched foil at an elevated temperature for a more or less prolonged period of time, thereby substantially reducing the shrinkage capacity in the direction of stretching. Foils are normally made of highly linear thermoplastic polymers, particularly those fiber-forming or film-forming polymers which permit an orientation of the linear molecules and which exhibit a more crystalline structure after being stretched. In all cases, a stretching of the narrow film strips is essential for purposes of the present invention, but on the other hand, the outer or covering foil sheets may remain unstretched or may be biaxially stretched and/or thermally fixed.

The foil strips employed for the reinforcing insert of the composite foil preferably extend at right angles to one another and are preferably laid one over the other in the same manner as the so-called thread layers of a non-woven and non-connected textile fabric. The individual foil strips in each of the lengthwise and crosswise groups, respectively, are preferably maintained in substantially parallel alignment until they are firmly fixed or adhered in place. Furthermore, it is quite expedient for the individual parallel foil strips to be distributed, preferably uniformly, so as to exhibit a free intermediate space between one another which amounts to at least 1.5 times the width of the foil strips, preferably at intervals of not less than 2 to 2.5 times the width of the strips up to approximately 10 and preferably less than 6 times the width of the strips, If desired, the lengthwise and crosswise running foil strips, respectively, can have the same or different widths, but for technical and economical reasons in the production of such strips, it is generally desirable to choose the same width for all of the foil strips. In order to obtain a uniform product, it is desirable for the parallel running foil strips to be spaced at equal intervals, and these spaced intervals can also be equal in both the longitudinal and transverse directions, although variations in the spaced interval can be made in this latter instance where it appears to be appropriate. Most preferably, however, the narrow foil strips forming the grid-shaped or latticed reinforcing structure should be placed together to provide meshes which generally do not vary or vary only slightly from a quadratic shape.

In order to provide special effects, for example, for purposes of marking or identification of a packaging material, one can use colored bands, bands metallized by evaporation, or similar variations in appearance which do not affect the essential properties of the stretched foil strips. Depending upon the purpose of use, the coloring of the foil strips can be alike or different in lengthwise or crosswise positions or in individual foil strips, so that the final composite foil can be made decorative or provided with an easy identification of linear measurement, particularly where the outer foil sheets are highly transparent or translucent.

The outer or covering foils of the composite structure can be made of any suitable thermoplastic polymer of the many which are known to be suitable for the production of foils. Such polymers generally include polyolefins, polyesters, polyamides, and similar linear synthetic polymers, as well as artificial or synthetic cellulosic materials such as cellulose acetate. However, the best results are generally achieved by using reasonably strong but relatively ductile polymer foils such as polyethylene, polypropylene or polyvinyl chloride (PVC).

The thermoplastic polymers employed for producing the narrow foil strips should be selected from those which exhibit a relatively high tensile strength even in the unstretched state and preferably the best possible elastic strain behavior, and also one which exhibits the highest possible elastic strain value in the stretched state. In terms of the resistance to rupture or breaking, this elastic strain value plays a very essential role, and is sometimes referred to as the elastic elongation, i.e. as a measure of the extent to which the foil can be stretched without causing any substantial permanent deformation. With this property, there is little danger that suddenly occurring and/or strongly localized stresses will cause individual foil strips to crack or break. At the same time, the outer foil sheets are often advantageously employed in an unstretched form for many purposes of packaging, but with the specific reinforcing insert composed of foil strips in accordance with the invention, the composite film or foil of the invention surprisingly offers a high degree of protection against local tearing, for example, when inserting a pointed or sharp-edged object into the foil package.

Thus, while it would be possible to use exactly the same material for both the outer foil sheets and the narrow foil strips of the reinforcing insert, it has been found to be particularly advantageous to use such a combination of materials that the stretched foil strips of the reinforcing structure exhibit a proportionately higher elongation at break, a higher breaking strength and a higher elastic strain value as compared to the outer or covering foil sheets. At the same time, it is advantageous to use a conventional foil material for the outer foil sheets with a ductility which is above that of the reinforcing insert. In this respect, one can use the same foil material for the outer foil sheets and the inner foil strips, e.g. a polyolefin such as polyethylene or polypropylene, provided that the inner foil strips have been stretched to a substantially greater extent so as to provide the specified properties.

In many cases, it has proven to be especially advantageous to employ different materials in each of the covering foil sheets. For example, one can combine an outer covering foil composed of plasticized PVC with an inner covering foil of polypropylene or polyethylene. The outer covering foil then exhibits great toughness and good strength while the inner foil prevents the emergence of plasticizing substances on the inner side of the composite foil. One can also use, for example, a polypropylene foil on the outer covering side of the composite structure and a polyethylene foil on the inner side. In this respect, the outer and inner sides of the composite structure relate to the manner in which various objects or materials are to be packaged within the composite foil.

In accordance with the invention, it is also possible to produce a shrunken or contracted foil reinforced by the grid-shape insert. For this purpose, a biaxially stretched material is employed for the outer or covering foil sheets and a longitudinally stretched material is employed for the narrow foil strips which form the reinforcing insert. The two stretched materials, i.e. the outer foil sheets and the inner laid foil strips are then assembled into the composite structure without being thermally fixed after stretching. The shrinkage capacity of the outer foil sheets and the inner foil strips must be adapted to one another in both the lengthwise and crosswise directions. For the production of a reinforced, shrinkable composite foil, the following are especially suitable by way of example: foils of all or at least most of the foil-forming polyolefins such as polypropylene and polyethylene; and foils of polyesters, polyamides, PVC and others. After the shrinkable composite foil is assembled, it can then be subjected to a thermal fixing treatment in order to produce a preshrunk and dimensionally stable composite foil.

The narrow foil strips which form the reinforcing insert, which are essentially stretched only in the longitudinal direction and which are preferably thermofixed to provide a composite foil of greater dimensional stability, should exhibit an elongation at break of 12 to 45% and preferably about 15 to 23%. In some cases, it has proven to be particularly advantageous for the foil strips running longitudinally and transversely of one another to have a different elongation at break in each case. Thus, composite foils according to the invention are of particular value wherein the elongation at break of the reinforcing insert amounts to 12 to 30%, preferably 15–25%, in the longitudinal direction and 20–45%, preferably 22–33%, in the transverse direction. Also, where different elongations at break are provided in the longitudinal and transverse directions of the foil strips, the elastic strain value should also exhibit a similar difference, and more particularly, the elastic strain value in the direction with the greater elongation at break should preferably amount to 1.2 to 2 times the elastic strain of the other direction. Again, these particular variations are most valuable when using outer foil sheets which have been biaxially stretched, since one invariably produces distinctly different properties in the longitudinal and transverse directions of the biaxially stretched film or foil.

It has been found that the width of the narrow foil strips employed in the reinforcing insert can lie between 1 and approximately 6 mm., although a width of between 2 and 4 mm. is especially advantageous. The thickness of these foil strips should generally amount to not less than 5 microns and not over 100 microns and preferably lies between 20 and 75 microns. However, these foil strips can also be suitably produced from very high tensile strength foil materials which are extremely thin. The maximum thickness of the foil strips is quite important in terms of the final appearance of the composite foil as well as the cohesiveness or adherence of the two outer foil sheets with each other and with the reinforcing insert.

In the production of composite foils according to the invention, different combinations of specific materials have proven to be especially valuable. Thus, extremely good results have been achieved with specific polyolefin materials, whether using the same specific polyolefin having different physical properties or when using different polyolefins. For example, in one embodiment, both the outer foil sheets and the narrow foil strips can be produced out of polyethylene wherein the outer foil sheets remain unstretched for packaging purposes while the inner foil strips of the reinforcing insert are stretched to provide a distinct difference in properties. An advantageous combination is also represented by a composite foil in which the preferably unstretched outer covering foil sheets consist of polyethylene and the narrow foil strips, which are stretched and then preferably thermofixed, consist of polypropylene. A mixed polymer or melt blend of polyolefins can also be used for the foil strips, preferably one which consists of a major proportion of an isotactic polypropylene with more than a 5% atactic content and a minor proportion of a low-pressure polyethylene. The atactic content of the polypropylene is preferably about 15 to 30% by weight thereof, and the proportion of low-pressure polyethylene in the polymer mixture is preferably 5 to 25% by weight.

The fabrication of the composite foil of the invention proceeds in a relatively simple manner in that the two outer foil sheets with the reinforcing grid-shaped foil strips positioned therebetween are led together into any suitable pressing means such as a press roll and are thereby firmly pressed together. At least the two outer foil sheets must be bonded or adhered together through the open intervals or meshes of the grid-shaped insert. This adherence can generally be accomplished with the aid of any adhesive conventionally employed as a bonding agent for thermoplastic foils. For purposes of bonding, the adhesive can for example be applied to one or both of the inwardly facing surfaces of the outer foil sheets prior to their being led together and pressed into the composite structure. Where the adhesive is applied to only one of the two outer foil sheets, the points of adherence are interrupted in those areas where the narrow foil strips run in the grid-shaped insert. Where a coating of adhesive is applied to both outer foil sheets, then the interruption of adherence occurs only at the points where one set of foil strips overlaps the other set. At such points, the narrow foil strips are adhered only to one or both of the outer foil sheets provided with the adhesive. For most purposes, it has been established that this partial lack of bonding has no serious disadvantage and for some purposes of utility exhibits a certain advantage, if the open interval between the narrow foil strips is at least 1.5 times, preferably not less than 2 to 2.5 times, the width of the foil strips. In some cases, however, especially when an especially high rupturing strength is required, it is expedient to provide a complete adhesion between all of the foil elements of the composite structure. In this case, the surfaces of the grid-shaped reinforcing insert opposite the outer foil sheets and facing one another should likewise be provided with an adhesive coating. In such cases, it is generally also sufficient if the adhesive is applied only onto the lengthwise running foil strips, e.g. before the transversely running strips are laid thereover.

A complete adherence such that the foil strips are mutually adhered to each other end to both of the outer foil sheets is only rarely used and is not necessary except where the highest possible requirements are placed on the rupture strength of the composite foil. In this case, the interval between the foil strips can also be somewhat narrower as compared to the values set forth above. For practical purposes, it has been found that very good results can always be achieved simply by applying the adhesive to only one inner surface of an outer foil sheet so as to greatly simplify the assembly or fabrication of the composite foil.

It was quite surprising to find that a composite foil in the form of a substantially planar or sheet-like structure could be reinforced by means of a latticed or grid-shaped foil which is itself composed only of narrow strips of foil, e.g. the same type of material in terms of physical structure as the outer or covering foil sheets. In particular, it was quite impossible to foresee the especially advantageous effect of the composite foil of the invention, because it was well known that the thread materials previously used for reinforcing such composite films exhibited a considerably higher tensile strength and resistance to tearing then could narrow and thin foil strips as employed in the present invention. One would normally expect that the resulting decrease of strength by using foil strips would lead to a completely insufficient reinforcement and that the more favorable approach would simply be to insert a third biaxially stretched foil sheet between the two outer covering foils. Of course, in this case one would also more than double the amount of material required in the composite foil, but because the fabrication would be essentially much simplier, the resulting expense would also be considerably smaller. It has been proven, however, that this approach is not feasible, because such a complete foil sheet insert fails to achieve the desired increase in rupture strength, particularly with reference to contact of the foil with sharp edges causing localized stresses. Thus, such a biaxially stretched foil insert can actually exhibit high strength longitudinally and transversely, but it is again very susceptible to local stresses or wear and tear, e.g. by a sharp edge. Accordingly, it was quite surprising that it is not the foil itself but only narrow strips produced from such a foil material and stretched and laid longitudinally and transversely as an insert which are capable of yielding a composite foil having a highly improved resistance to local stresses as compared to those composite foils reinforced with a textile or thread-like planar structure.

The composite foil of the invention is obviously useful for many purposes, particularly for packaging subject to high localized stressing as in the building trades for the packaging of building materials and in general for any packaging or protective covering application where foils with a high resistance to rupturing and further tearing is extremely important.

Figure 2:
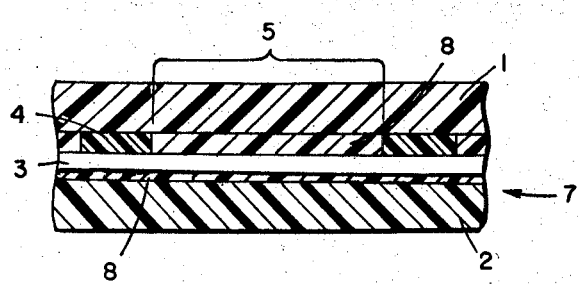

The composite foil and its method of fabrication is further illustrated in connection with the accompanying drawing wherein:

FIG. 1 is a perspective view of a short length of the composite film structure opened at one end to show the individual elements of the structure; and FIG. 2 is a cross-sectional view taken longitudinally and perpendicularly to the flat surfaces of the composite foil.

In the drawings, the two outer or covering foils 1 and 2 are provided in the usual manner with an adhesive coating, for example on the inwardly facing surface of the lower foil or sheet 2. Between these two foils 1 and 2, there is inserted a grid-shaped foil reinforcement formed of the lengthwise narrow foil strips 3 and the crosswise foil strips 4. In each set of foil strips 3 and 4, i.e. in the longitudinal and transverse directions, respectively, the individual foil strips are substantially parallel to each other and are positioned at substantially the same intervals 5 and 6. Also, the lengthwise strips 3 lie at right angles to the crosswise strips, while the intervals 5 and 6 are preferably identical and uniform throughout the entire structure. The composite foil 7 then results as the foil strips and the covering foils or sheets are pressed together, e.g. by suitable press rolls or the like (not illustrated).

In FIG. 2, it will be noted that the foil strips are substantially thinner than the outer foil sheets, this cross-sectional view being substantially enlarged in order to illustrate greater detail. The adhesive or bonding agent 8 coated on the upper surface of the lower foil sheet 2 is generally forced during the pressing operation upwardly through the open intervals or free spaces 5 of the grid-shaped reinforcing insert, such that the adhesive is placed firmly in contact with the lower surface of the upper foil sheet 1. The longitudinal strips 3 are of course also adhered to the lower foil sheet 2. If the adhesive is also initially applied to the lower surface of the upper foil sheet 1, then both of the lengthwise and crosswise foil strips 3 nd 4 become firmly adhered to their adjacent outer foil sheets. In this case the various foil elements are completely bonded together except at the points of intersection 9 where the crosswise foil strips 4 are laid over the lengthwise strips 3. Finally, it is possible to also coat and adhere these points of intersection 9 although this is seldom necessary.

Minor variations in the structure and materials used in the composite foil of the invention can be readily employed within the prescribed limits of the invention. It has been found, however, that especially excellent results are achieved when the structure shown in the drawings is produced by using foil strips composed of a melt blend of about 75 to 95% by weight of an isotactic polypropylene which contains from 5 to 40%, preferably 15 to 30%, of an atactic content, and about 5 to 25% by weight of a low-pressure polyethylene. Both of these polyolefins are described in considerable detail in the prior art, but the specific melt blend of these two particular polymers has proven to be of significant advantage in the composite foil structure of the invention, particularly when these foil strips have been initially stretched to about 6 to 18 times their original length. At the same time, however, it is most advantageous to employ relatively ductile foil materials for the two outer or covering foils with polyethylene, polypropylene or polyvinyl chloride being especially preferred. On the other hand, there is still a significant improvement regardless of the specific materials selected in terms of a high resistance to local stresses as well as a resistance to an initial rupture leading to a long tearing or detachment of one portion of the foil structure from another. In other words, there is a relative improvement far beyond that which might have been expected regardless of the particular materials employed.

Because there are only a few foil elements or components in the composite structure of the invention, it can be very easily fabricated by conventional methods and apparatus. Once fabricated, these composite foils provide a substantial improvement in rupture resistance and are also quite resistant to wear and tear under conditions which tend to produce ruptures, punctures, abrasion and especially localized pressures or stresses even when repeated many times. By selecting film-forming materials which are known to have a relatively high strength, the composite foils of the invention have a very long life not only in simple packaging applications but also for use as a durable protective covering material.

The invention is hereby claimed as follows:

1. A composite thermoplastic foil consisting of two outer foil sheets interconnected by an adhesive and a grid-shaped planar reinforcing structure held between said two sheets and consisting of longitudinally stretched narrow foil strips laid in a criss-cross pattern at spaced substantially parallel intervals, said strips having a thickness of not more than 100 microns and a width of approximately 1 to 6 mm. with a spaced interval between individual pairs of strips of at least 1.5 times the width of the strips.

2. A composite foil as claimed in claim 1 wherein said foil strips have been thermofixed after being longitudinally stretched.

3. A composite foil as claimed in claim 1 wherein the lengthwise and crosswise foil strips run at right angles to one another and are laid one over the other.

4. A composite foil as claimed in claim 1 wherein the spaced interval between individual pairs of strips is about 2 to 10 times the width of the strips.

5. A composite foil as claimed in claim 4 wherein all of the foil strips have the same width.

6. A composite foil as claimed in claim 5 wherein the spaced intervals between parallel running strips are the same lengthwise and crosswise.

7. A composite foil as claimed in claim 1 wherein the foil strips have a proportionately higher elongation at break, breaking strength and elastic strain value but a lower ductility than the outer foil sheets.

8. A composite foil as claimed in claim 7 wherein said outer foil sheets and said foil strips consist essentially of the same thermoplastic polymer.

9. A composite foil as claimed in claim 7 wherein the outer foil sheets remain unstretched.

10. A composite foil as claimed in claim 7 wherein the outer foil sheets are biaxially stretched and the foil strips are longitudinally stretched and are assembled into said reinforced composite foil without being thermofixed.

11. A composite foil as claimed in claim 10 wherein the shrinkage capacity of the outer foil sheets and the foil strips is substantially the same.

12. A composite foil as claimed in claim 7 wherein the foil strips are stretched to provide an elongation at break value of 12 to 45%.

13. A composite foil as claimed in claim 12 wherein the elongation at break value of the foil strips running longitudinally with reference to the outer foil sheets is 12 to 30%, and the elongation at break value of the foil strips running transversely thereto is about 20 to 45%.

14. A composite foil as claimed in claim 7 wherein the elastic strain value of the foil strips is at least 2%.

15. A composite foil as claimed in claim 14 wherein the elastic strain value of the foil strips running transversely to the longitudinal dimension of the outer foil sheets is about 1.2 to 2 times higher than elastic strain value of the foil strips running longitudinally of the outer foil strips.

16. A composite foil as claimed in claim 7 wherein the thickness of the foil strips is about 5 to 100 microns.

17. A composite foil as claimed in claim 7 wherein the foil strips have a width of about 2 to 4 mm., a thickness of about 20 to 75 microns, an elastic strain value of not less than 5% and an interval between adjacent parallel running strips of at least 2 up to about 10 times the width of the individual foil strips.

18. A composite foil as claimed in claim 1 wherein both the outer foil sheets and the foil strips consist of polyethylene.

19. A composite foil as claimed in claim 1 wherein the outer foil sheets consist of polyethylene and the foil strips consist of polypropylene.

20. A composite foil as claimed in claim 1 wherein the foil strips consist of a polymer mixture of isotactic polypropylene having an atactic content of more than 5% up to about 30% in a major proportion and a low-pressure polyethylene in a minor proportion.

21. A composite foil as claimed in claim 20 wherein said polymer mixture contains 5 to 25% by weight of said low-pressure polyethylene.

22. A composite foil as claimed in claim 1 wherein an adhesive coating has been applied to the inner surface of only one of the outer foil sheets with the other foil sheet and the overlapping foil strips of the reinforcing insert being adhered thereto.

23. A composite foil as claimed in claim 1 wherein the foil strips of the reinforcing insert are adhered to both of the outer foil sheets.

24. A composite foil as claimed in claim 1 wherein the foil strips of the reinforcing insert are adhered outwardly to both outer foil sheets and inwardly to each other.

References Cited

UNITED STATES PATENTS

| | | | |
|---|---|---|---|
| 2,281,635 | 5/1942 | Strauss | 161—55UX |
| 2,772,993 | 12/1956 | Magnuson | 161—55UX |
| 3,058,863 | 10/1962 | Gaines et al. | 161—55UX |

FOREIGN PATENTS 626,443   8/1961   Canada _ 161—Polyethylene Dig.

ROBERT F. BURNETT, Primary Examiner

W. A. POWELL, Assistant Examiner

U.S. Cl. X.R.

156—179; 161—57, 165